(12) United States Patent
Bielefeld et al.

(10) Patent No.: US 6,609,254 B2
(45) Date of Patent: Aug. 26, 2003

(54) PROTECTIVE HELMET AND METHOD OF MAKING SAME

(75) Inventors: Eric Bielefeld, Lexington, KY (US); Mark Ferguson, Cynthiana, KY (US)

(73) Assignee: E. D. Bullard Company, Cynthiana, KY (US)

( * ) Notice: Subject to any disclaimer, the term of this patent is extended or adjusted under 35 U.S.C. 154(b) by 0 days.

(21) Appl. No.: 10/082,389

(22) Filed: Feb. 25, 2002

(65) Prior Publication Data
US 2002/0116749 A1 Aug. 29, 2002

Related U.S. Application Data
(60) Provisional application No. 60/271,953, filed on Feb. 28, 2001.

(51) Int. Cl.[7] ............................................... A42B 3/00
(52) U.S. Cl. ........................................................ 2/416
(58) Field of Search ............................ 2/416, 417, 418, 2/419, 420, 421; 264/279, 275, 279.1, 161, 251, 257, 273, 160

(56) References Cited

U.S. PATENT DOCUMENTS

| | | | |
|---|---|---|---|
| 1,522,024 A | | 1/1925 | Nixon, Jr. |
| 3,151,359 A | | 10/1964 | Campbell et al. |
| 3,262,125 A | | 7/1966 | Bowen |
| 3,698,108 A | | 10/1972 | Brunner |
| 3,909,846 A | | 10/1975 | Zahn |
| 4,055,860 A | | 11/1977 | King |
| 4,337,574 A | | 7/1982 | Hughes et al. |
| 4,402,115 A | * | 9/1983 | Moertel ............... 264/251 |
| 4,525,231 A | | 6/1985 | Wnuk |
| 4,556,190 A | | 12/1985 | Smith |
| 4,581,188 A | * | 4/1986 | Westerman, Jr. ............ 264/107 |
| 4,818,205 A | * | 4/1989 | Burke et al. ............... 264/257 |
| 4,921,671 A | * | 5/1990 | Staheli ................... 264/161 |
| 4,950,445 A | | 8/1990 | Salce et al. |
| 4,961,894 A | | 10/1990 | Yabe et al. |
| 5,088,130 A | | 2/1992 | Chiarella |
| 5,094,607 A | | 3/1992 | Masters |
| 5,119,516 A | | 6/1992 | Broersma |
| 5,135,694 A | | 8/1992 | Akahane et al. |
| 5,238,632 A | * | 8/1993 | Watters et al. ............... 264/151 |
| 5,477,563 A | | 12/1995 | Gentes et al. |
| 5,481,762 A | | 1/1996 | Gentes et al. |
| 5,619,756 A | | 4/1997 | Garneau |
| 5,745,923 A | | 5/1998 | Katz |
| 5,795,535 A | * | 8/1998 | Giovannone et al. ....... 264/551 |

FOREIGN PATENT DOCUMENTS

JP          361079610 A     4/1986

OTHER PUBLICATIONS

International Search Report for International application PCT/US02/05924.

* cited by examiner

Primary Examiner—Rodney M. Lindsey
(74) Attorney, Agent, or Firm—Stites & Harbison, PLLC; David W. Nagle, Jr.

(57) ABSTRACT

A protective helmet includes: a shell, a headband with an absorbent brow pad, and a suspension. A key is secured to each end of each of the straps of the suspension for insertion into respective key sockets spaced about the periphery of the shell of the protective helmet along its lower edge. Of particular importance to the protective helmet of the present invention, many (if not all) of the keys are molded directly to and around a strap, rather than sewn to the strap. In the method of the present invention, lengths of strap material are positioned in a mold, and plastic is injected into the mold cavity to encapsulate the straps and form the plastic component, e.g., a key for the suspension of the protective helmet. A trimming die is used to trim any webbing scrap between parts or other extraneous materials resulting from the molding of the plastic component to the straps.

12 Claims, 8 Drawing Sheets

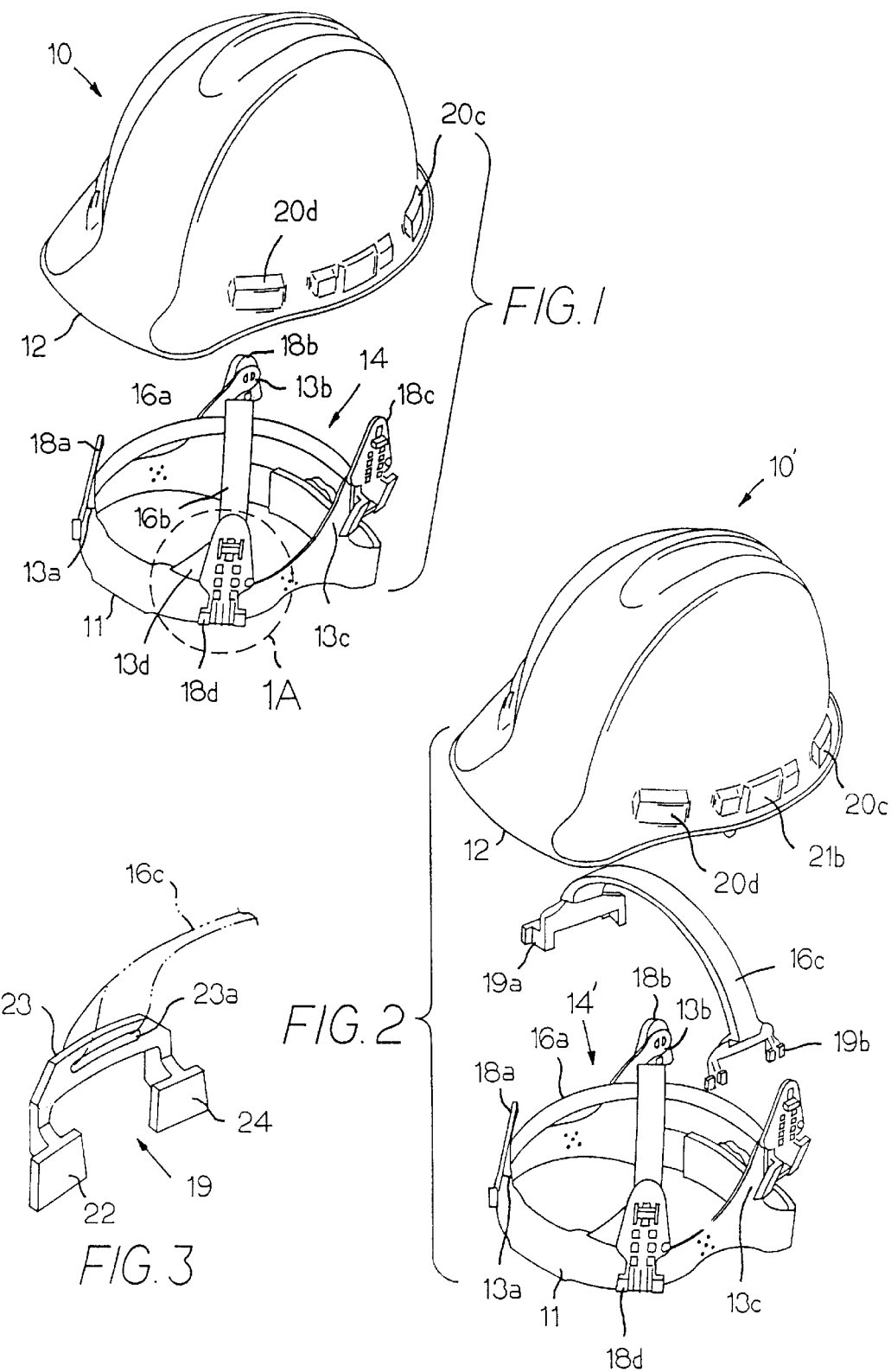

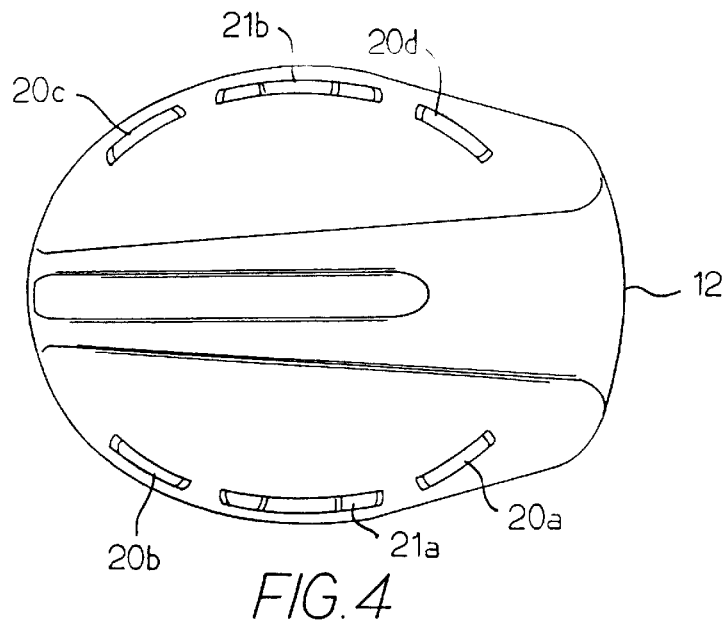
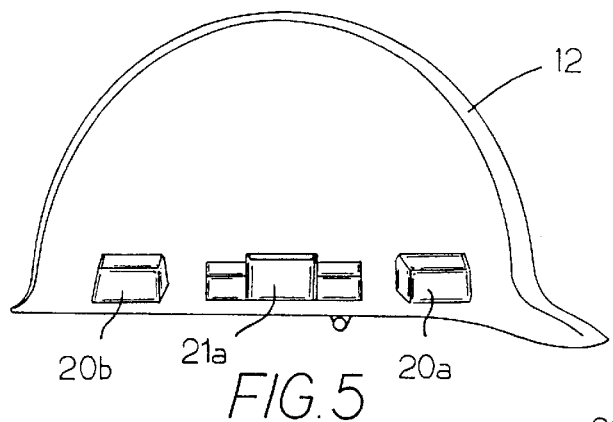
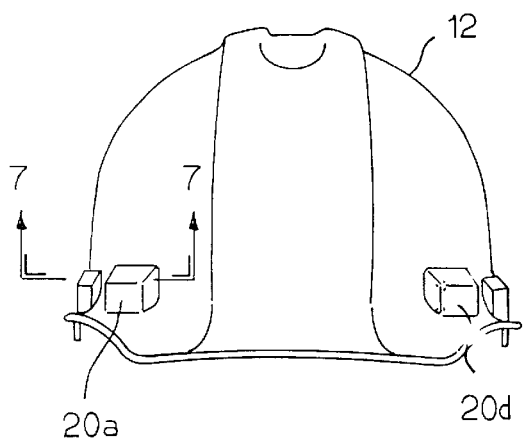
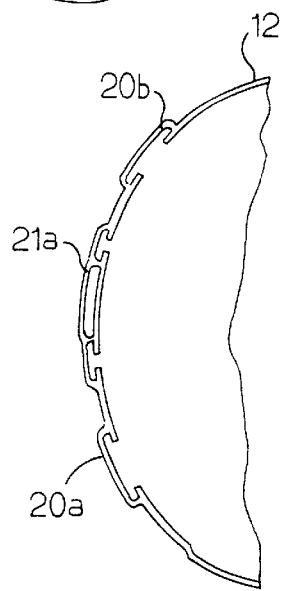
FIG. 4
FIG. 5
FIG. 6
FIG. 7

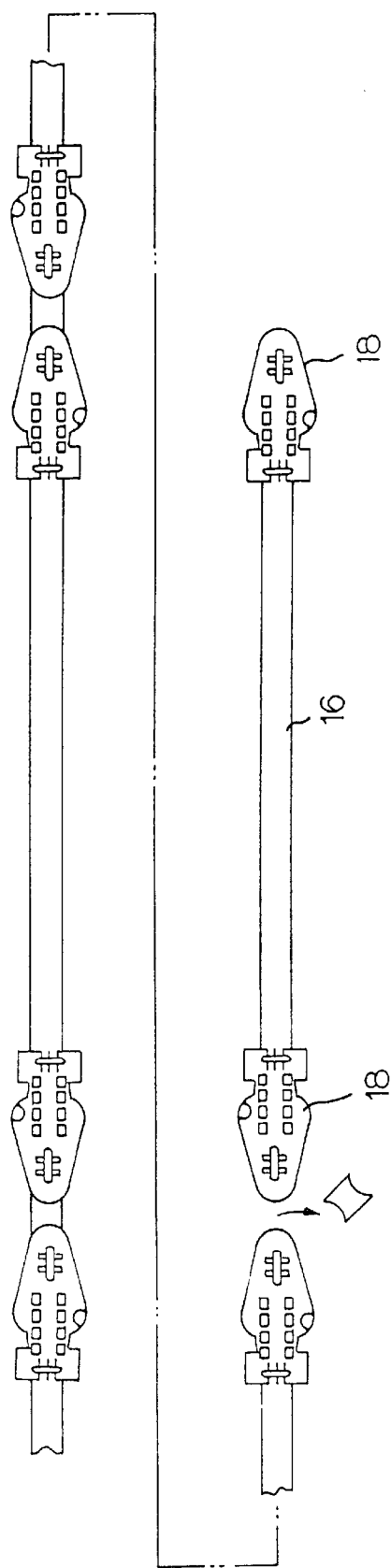

PROTECTIVE HELMET AND METHOD OF MAKING SAME

CROSS-REFERENCE TO RELATED APPLICATIONS

The present application claims priority from U.S. provisional application 60/271,953 filed Feb. 28, 2001, the entire disclosure of which is incorporated herein by reference.

BACKGROUND OF THE INVENTION

The present invention relates to a protective helmet with an improved suspension system and a method for making such a protective helmet.

Protective helmets are commonly worn in the industrial workplace to prevent or reduce the likelihood of head injuries. The hard hat is the most common and well-recognized protective helmet A hard hat consists of three essential components—a shell, a headband, and a suspension system—which cooperate to reduce the potential for injury by attenuating some translational energy of the force of an impact to the helmet.

With respect to the construction and protection afforded by a hard hat, the American National Standards Institute ("ANSI") promulgates minimum performance requirements for protective helmets and further classifies helmets based on their ability to reduce the forces of impact and penetration, as well as their ability to protect against high voltage electric shock. See, for example, ANSI Z89.1–1997 (R1998), American National Standard for Industrial Head Protection.

As mentioned above, the hard hat components cooperate to provide the requisite level of protection. The hard hat shell itself causes any force of impact to be spread across the surface area of the shell. More importantly, the hard hat suspension separates the wearer's head from the shell such that there is an air gap between the shell and the wearer's head that provides for further attenuation of the force of an impact to the shell. Specifically, when an object strikes the shell of the hard hat, the shell itself flexes inward and the straps of the suspension will stretch. The air gap, which generally measures between one and two inches, accommodates the flexing of the shell and stretching of the straps, but, under normal conditions, prevents the wearer's head from contacting the hard hat shell.

A hard hat suspension is typically constructed of two or three intersecting straps manufactured from a nylon fabric. Sewn to each end of each strap is a "key," which is then inserted into a molded slot in the shell referred to as a "key socket." The industry terms "4-point suspension" and "6-point suspension" refer to the number of keys used in a particular suspension.

In manufacturing a hard hat with either a 4-point or a 6-point suspension, the most costly and time-consuming step is the assembly of the suspension. Specifically, the individual keys have to be sewn to the straps of the suspension.

It is therefore a paramount object of the present invention to provide a protective helmet that meets the requisite ANSI performance requirements yet is less costly and time-consuming to manufacture.

It is another object of the present invention to provide a protective helmet in which the construction and orientation of the straps lessens the likelihood that the straps will be pulled free of the keys as a result of the force of an impact to the shell.

These and other objects and advantages of the present invention will become apparent upon a reading of the following description.

SUMMARY OF THE INVENTION

The present invention is a protective helmet with an improved suspension system and a method for making such a protective helmet. A preferred protective helmet manufactured in accordance with the present invention includes: a shell, a headband with an absorbent brow pad, and a suspension. The protective helmet may have a 4-point suspension comprising two intersecting straps, or a 6-point suspension, comprising three intersecting straps. In any event, a key is secured to each end of each of the straps. To secure the suspension to the shell of the protective helmet, the shell includes a plurality of key sockets spaced about the periphery of the shell along its lower edge. Each key of the suspension is received and retained in a respective key socket. Of particular importance to the protective helmet of the present invention, many (if not all) of the keys are molded directly to and around a strap, rather than sewn to the strap as is common in prior art constructions.

In the preferred manufacturing method, lengths of strap material are positioned in a mold that includes a series of alignment blocks that serve to guide and align the straps within the mold. Once the lengths of strap are so positioned, the mold is closed, and plastic is injected into the mold cavity to encapsulate the straps and form the plastic component, e.g., a key for the suspension of the protective helmet. In this regard, it is contemplated and preferred that the straps have a surface texture that allows the injected plastic to grip the strap material, further strengthening the bond between the strap and the molded component. A trimming die is used to trim any webbing scrap between parts or other extraneous materials resulting from the molding of the plastic component to the straps.

DESCRIPTION OF THE FIGURES

FIG. 1 is an exploded perspective view of a hard hat made in accordance with the present invention and having a 4-point suspension;

FIG. 2 is an exploded perspective view of a hard hat made in accordance with the present invention and having a 6-point suspension;

FIG. 3 is an enlarged perspective view of a preferred key used in connection with the third strap of the 6-point suspension of the hard hat of FIG. 2;

FIG. 4 is a top view of the shell of a hard hat made in accordance with the present invention;

FIG. 5 is a side view of the shell of the hard hat of FIG. 4;

FIG. 6 is a front view of the shell of the hard hat of FIG. 4;

FIG. 7 is a sectional view of the shell of the hard hat of FIG. 4 taken along line 7—7 of FIG. 5;

FIG. 14 depicts a strap manufactured using the equipment of FIG. 10 and designed for incorporation into a suspension for a protective helmet as shown in FIGS. 1 and 2.

DETAILED DESCRIPTION OF THE INVENTION

Figure 1A:
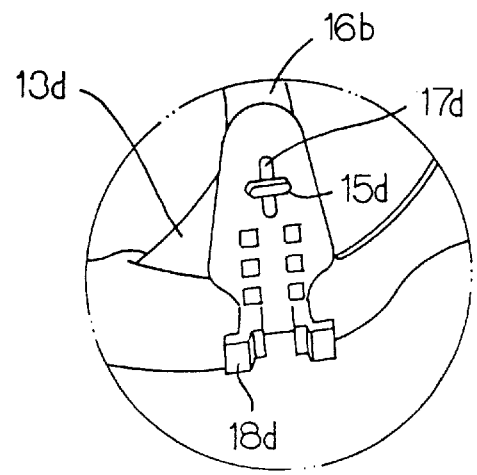
FIG. 1A is an enlarged perspective view of a portion of the hard hat of FIG. 1, illustrating the attachment of the head band of the hard hat to the suspension.

The present invention is a protective helmet with an improved suspension system and a method for making such a protective helmet.

FIG. 1 is an exploded perspective view of a hard hat 10 manufactured in accordance with the present invention. As shown, this hard hat 10 generally includes: a substantially rigid shell 12 shaped to protect the wearer's head, said shell defining a bottom opening and an internal cavity for receiving the wearer's head; a headband 13 with an absorbent brow pad 11; and a suspension 14. In the embodiment of FIG. 1, the hard hat has a 4-point suspension 14 comprising two intersecting straps 16a, 16b. Although other materials (e.g., polypropylene) may be used without departing from the spirit and scope of the present invention, the preferred strap material is nylon with a width of approximately 0.75 inches and a thickness of approximately 0.015–0.030 inches.

A key 18a, 18b, 18c, 18d is secured to each end of each of the straps 16a, 16b. For further clarification of the preferred strap and key configuration, FIG. 14 depicts a preferred strap (generally indicated by reference numeral 16) with keys (generally and collectively indicated by reference numeral 18) secured to the ends of thereof. The keys 18 are preferably composed of high density polyethylene (HDPE), Grade T-50-200-01 available from Solvay S. A. of Brussels, Belgium. Again, other materials, including but not limited to nylon, low density polyethylene (LDPE), polypropylene, and acrylonitrile butadiene styrene (ABS), may be used without departing from the spirit and scope of the present invention. Of particular importance, as will be described in further detail below, the chosen material must be suitable for molding the key 18 directly to and around a strap 16, rather than sewn to the strap 16 as is common in prior art constructions.

To secure the suspension 14 to the shell 12 of the hard hat 10, the shell 12 includes four key sockets 20a, 20b, 20c, 20d spaced about the periphery of the shell 12 along its lower edge, as best shown in FIGS. 4–7, which provide various views of the preferred shell 12. Each of the key sockets 20a, 20b, 20c, 20d is molded into the shell 12 during an injection molding process and is adapted to receive a key. In this regard, it is contemplated and preferred that the keys 18 be constructed such that they can be "locked" into the key sockets 20, as is further described below. It is also important to note that, although injection molding is the preferred way to mold the hard hat shell 12, other molding and manufacturing methods could also be used without departing from the spirit and scope of the present invention.

As shown in FIG. 1 and the enlarged view of FIG. 1A, the head band 13 has a plurality of upwardly extending appendages 13a, 13b, 13c, 13d. Each such appendage 13a, 13b, 13c, 13d corresponds with a respective key 18a, 18b, 18c, 18d of the suspension 14. Referring specifically to the enlarged view of FIG. 1A, each key 18d defines a substantially rectangular opening 17d near the distal end thereof which is adapted to receive a T-shaped protrusion 15d integral with and extending from the appendage 13d of the head band 13. Specifically, the appendage 13d of the head band 13 can be manipulated to insert the T-shaped protrusion 15d through the opening 17d defined by the key 18d, but, once completely assembled, the T-shaped protrusion 15d is oriented substantially perpendicular to the opening 17d, as shown in FIG. 1A.

Figure 1B:
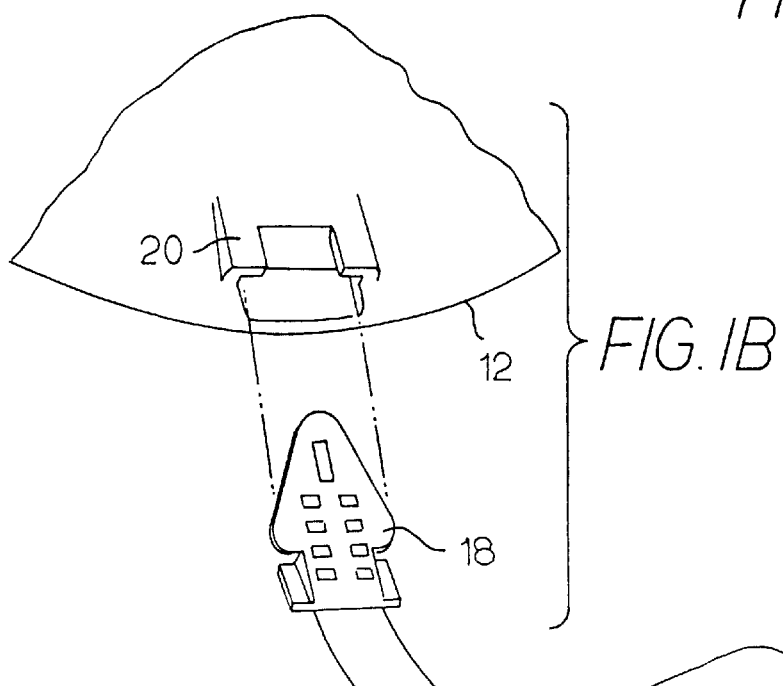
FIG. 1B is an enlarged exploded perspective view of a portion of the hard hat of FIG. 1, illustrating the insertion of a key of the suspension into a key socket molded into the shell of the hard hat.
Figure 1C:
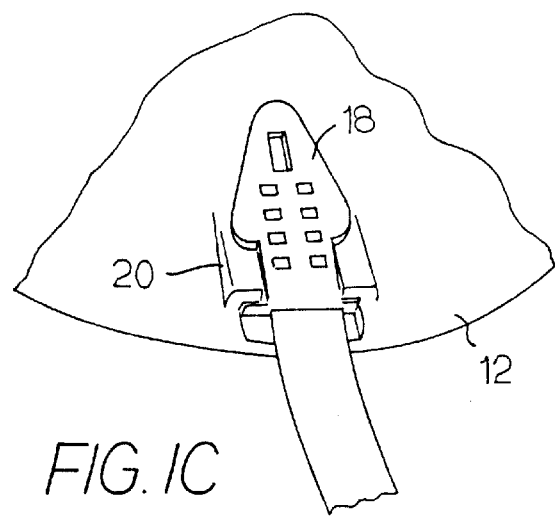
FIG. 1C is a second enlarged exploded perspective view of a portion of the hard hat of FIG. 1, also illustrating the insertion of a key of the suspension into a key socket molded into the shell of the hard hat.

For further clarification of the attachment of the suspension 14 to the shell 12 of the hard hat 10, FIG. 1B and 1C depict the insertion of a one key 18 into a socket 20. As shown, in this preferred embodiment, only a portion of the key 18 is actually received and retained in the socket 20, with the remainder of the key 18 abutting the inner surface of the shell.

Before moving to a description of the manufacturing method of the present invention, FIG. 2 is an exploded perspective view of a hard hat 10' manufactured in accordance with the present invention with a 6-point suspension 14', comprising three intersecting straps 16a, 16b 16c. In this particular embodiment, the keys 19a, 19b associated with the third strap 16c have a different structure and are not integrally molded to the strap 16c. Although the keys 19a, 19b are sewn rather that integrally molded to the strap 16c, these keys 19a, 19b could certainly be molded to the strap 16c without departing from the spirit and scope of the present invention.

FIG. 3 is a perspective view of such a preferred key 19 in accordance with the present invention. As shown, this particular key 19 is comprised of a central portion 23 defining a slot 23a and two downwardly extending appendages 22, 24. The distal end of the strap 16c is threaded through the slot 23a defined by the central portion of the key 19 with the two downwardly extending appendages 22, 24 being the portions of the key 19 that allow it to be secured to the shell 12 of the hard hat 10'. Specifically, the keys 19a, 19b are designed for insertion into key sockets 21a, 21b molded into the shell 12 and positioned along the lower edge of the shell 12, as best shown in FIGS. 4–7. Furthermore, as indicated in the exploded perspective view of FIG. 2, in constructing the preferred hard hat 10' with a 6-point suspension, the third strap 16c of the suspension 14' is inserted into and secured to the shell 12 of the hard hat 10' first. Then, the remaining straps 16a, 16b are inserted into and secured to the shell 12 of the hard hat 10', along with the attached head band 13.

As mentioned above, FIGS. 4–7 provide various views of the preferred shell 12. As shown, the preferred hard hat shell 12 includes each of the six key sockets 20a, 20b, 20c, 20d, 21a, 21b described above with reference to FIGS. 1 and 2. In this manner, the same hard hat shell 12 can be used regardless of whether a 4-point or a 6-point suspension is incorporated into the shell 12.

Figure 10:
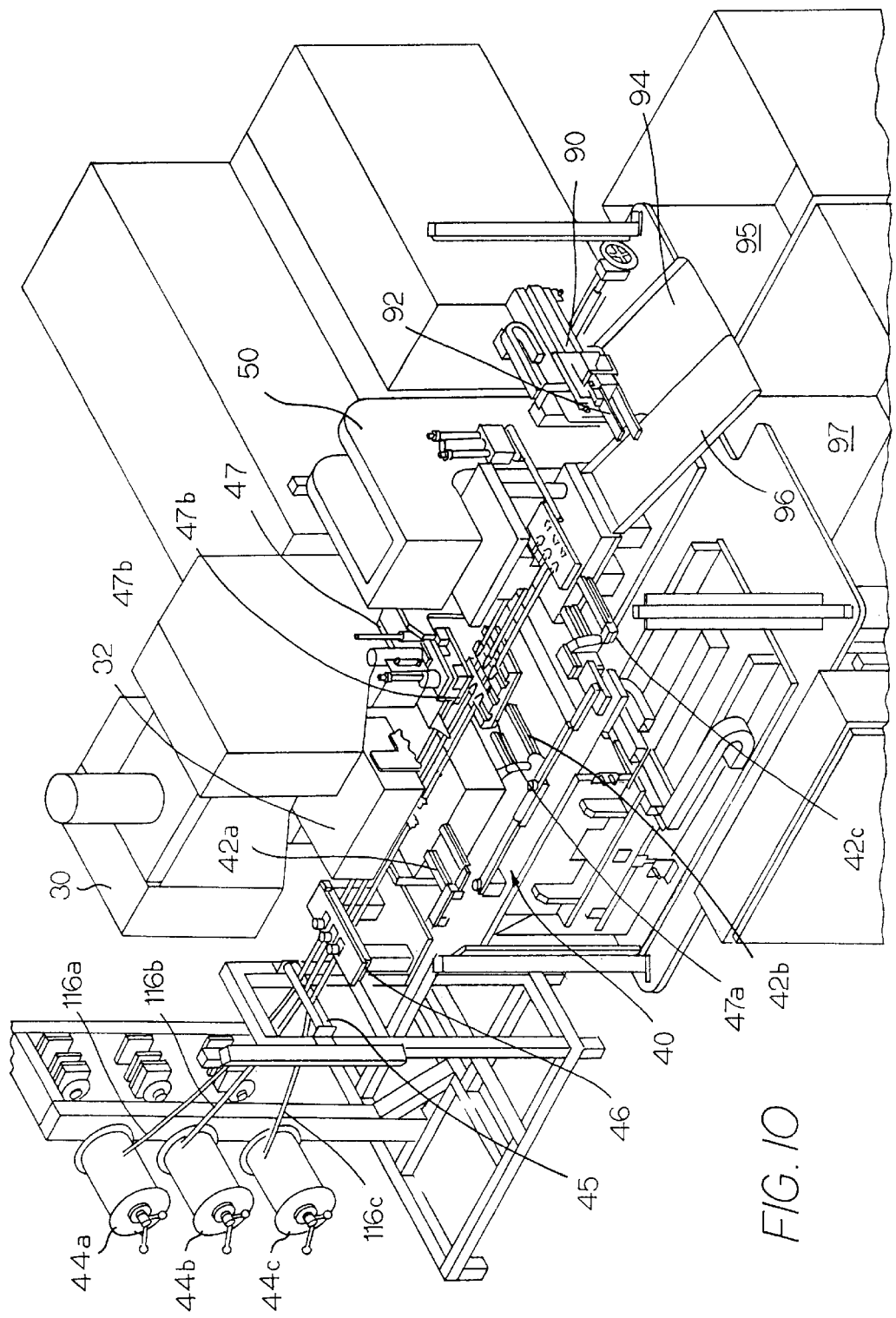
FIG. 10 is a perspective view of the equipment necessary for the molding of a plastic component (i.e., a key) to a strap in accordance with the present invention.

As described above with respect to FIG. 1, each key 18 of the 4-point suspension 14 is molded directly to and around a strap 16, rather than sewn to the strap 16. FIG. 10 is a perspective view of the equipment necessary for the manufacture of the straps and associated keys in accordance with the method of the present invention. As shown in FIG. 10, there are three primary components for carrying out the manufacture of the straps: a molding press 30 with an associated mold 32, a feeding system 40, and a trimming die 50.

Figure 13:
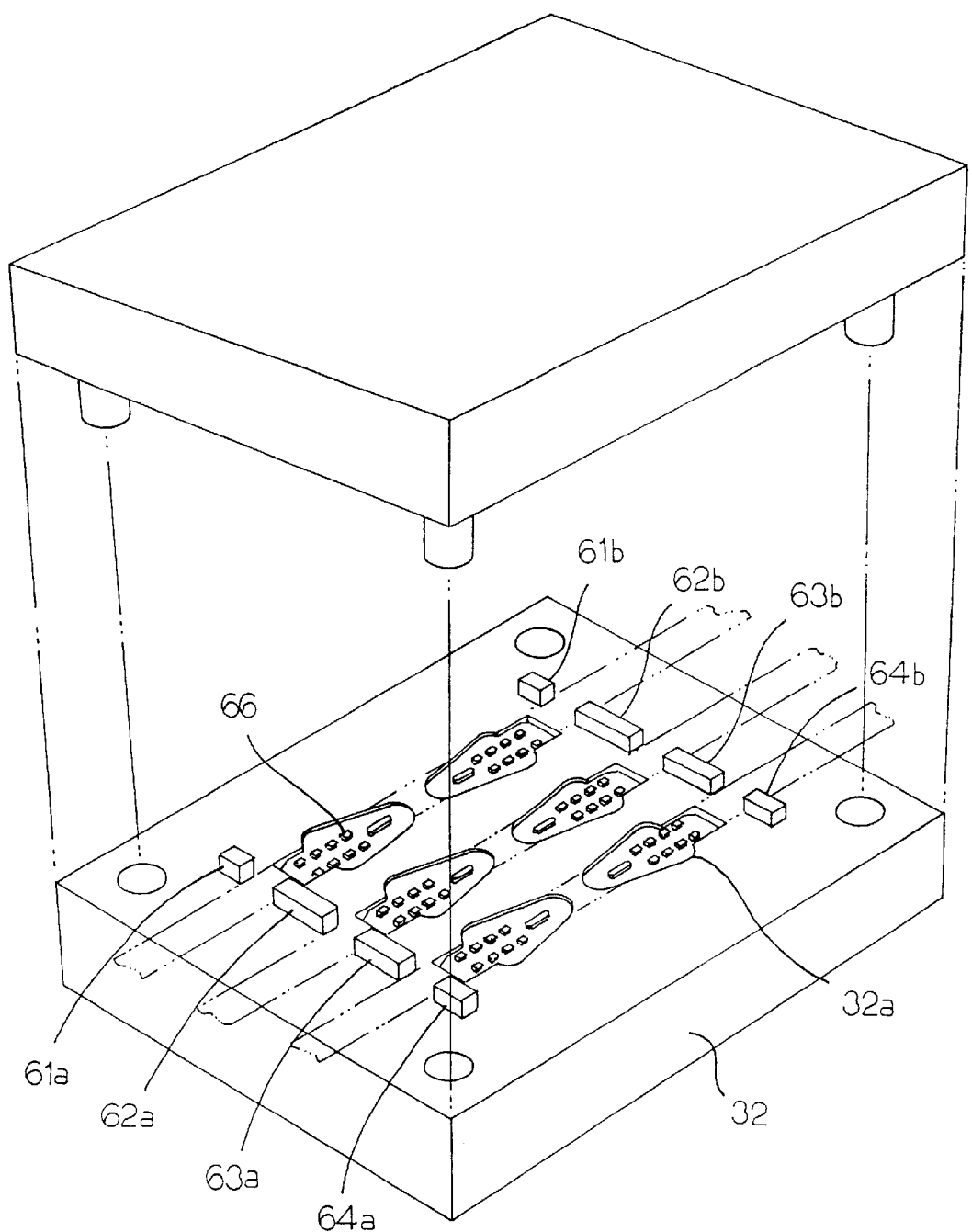
FIG. 13 is an enlarged perspective view of the mold depicted in FIG. 10 and used to mold a plastic component (i.e., a key) to a strap in accordance with the present invention.

The molding press 30, which is a vertical molding press in this preferred embodiment, is responsible for molding a key directly to and around a strap. As best shown in FIG. 13, the preferred mold 32 associated with the press 30 allows for the molding of six keys to three separate straps. Of course, the mold 32 could be designed and constructed to allow for the simultaneous molding of fewer or more keys without departing from the spirit and scope of the present invention.

In the preferred embodiment described herein, Applicant employs a Newbury Series™ Model 80 vertical molding press manufactured and distributed by Van Dorn Demag Corporation of Strongsville, Ohio. Furthermore, in connection with the vertical molding press, Applicant employs (1) a mold temperature controller, Model SMO80008 manufactured and distributed by Mold-Masters Limited Corporation of Georgetown, Ontario, Canada; (2) a Sentra™ water temperature controller manufactured and distributed by Advantage Engineering, Inc. of Greenwood, Ind.; and (3) a Model 19855 Plastics Loader manufactured and distributed by Maguire Plastics, Inc. of Aston, Pa.

Returning now to FIG. 10, in the manufacturing process, each of the straps 116a, 116b, 116c is first appropriately positioned in the mold cavity 32a (as shown in FIG. 13). Referring to FIG. 13, the mold includes a series of alignment blocks 61a, 62a, 63a, 64a, 61b, 62b, 63b, 64b that serve to guide and align the straps 116a, 116b, 116c within the mold 32. Once the straps 116a, 116b, 116c are so positioned, the mold 32 is closed, and plastic is injected into the mold cavity 32a, encapsulating the straps 116a, 116b, 116c. To control the encapsulation, it is contemplated and preferred that each of the straps 116a, 116b, 116c be centered in the cavity of the mold 32 with "fingers" integral with the mold 32. If a particular strap is not so centered within the mold cavity 32a, it may be pushed by the injected plastic to one side of the mold cavity 32a or the other, thus weakening the bond between or encapsulation of the strap and the molded key.

Referring still to FIG. 13, it can be seen that a plurality of fingers, generally indicated by reference numeral 66, is preferably associated with the molding of each key. Specifically, identical fingers 66 are defined in the upper and lower portions of the mold cavity 32a, such that, when the mold 32 is closed, the fingers 66 tightly grip and secure the strap material to prevent it from being pushed by the injected plastic. Indeed, when the mold 32 is closed, the fingers 66 defined by the upper portion of the mold are separated from the fingers 66 defined by the lower portion of the mold by a distance essentially identical to the thickness of the strap material.

Figure 8:
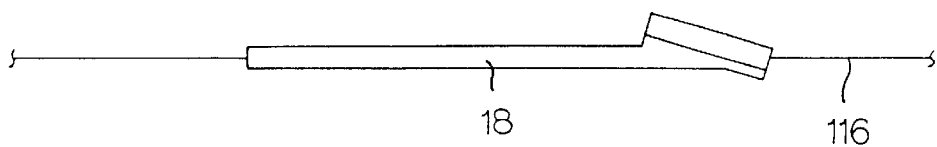
FIG. 8 is a side view depicting a plastic component (i.e., a key) molded to a strap in accordance with the present invention.
Figure 9:
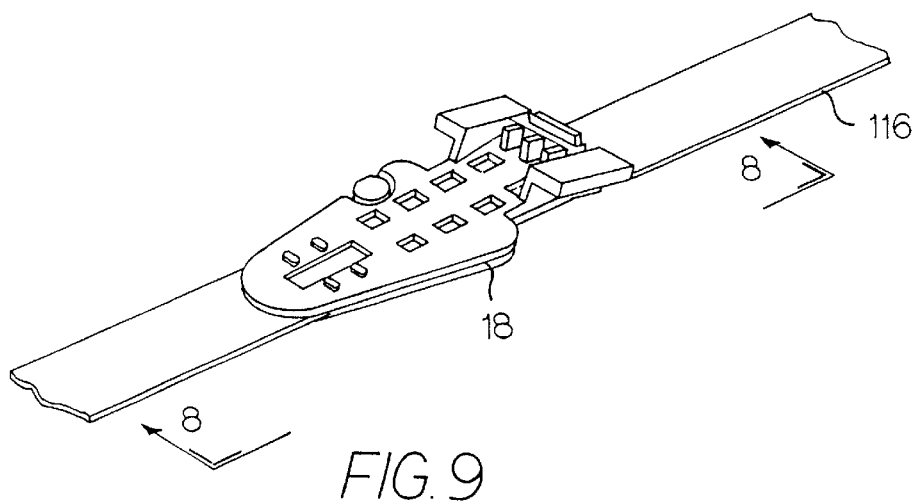
FIG. 9 is a perspective view depicting a plastic component (i.e., a key) molded to a strap in accordance with the present invention.

FIGS. 8 and 9 further illustrate the encapsulation of each strap 116, the integral key 18 being molded around and to the strap 116.

As a further refinement, it is contemplated and preferred that the straps 116a, 116b, 116c each have a surface texture that allows the injected plastic to grip the strap material, further strengthening the bond between the strap and the molded key. For example, although not shown in the Figures the preferred nylon strap of the present invention has a corrugated or fluted texture that runs the width of the strap on both sides of the strap. If the strap has such an appropriate texture, an adequate bond can be achieved between the strap and molded key even in the absence of any chemical bonding. Nevertheless, in certain circumstances, chemical bonding might be the natural result of the molding process, for example, when a nylon key is molded to a nylon strap. Moreover, in other circumstances, chemical bonding techniques might be utilized to strengthen the bond between the key and strap. Therefore, although the use of chemical bonding can be avoided, the use of chemical bonding is not a departure from the spirit and scope of the present invention.

Referring again to FIG. 10, the feeding system 40 is responsible for advancing the strap material into the appropriate position with respect to the mold 32, and then advancing the straps 116a, 116b, 116c with the integrally molded keys out of the mold cavity 32a. In this regard, in the preferred embodiment shown in FIG. 10, lengths of strap material are preferably stored on reels 44a, 44b, 44c. The feeding system 40 preferably includes three pairs of mechanical arms 42a, 42b, 42c and associated controls that are used to advance the straps through the manufacturing process, while also maintaining the position of the straps and tension in the straps throughout the manufacturing process, as will be further described below.

As mentioned above, the lengths of strap material are preferably stored on reels 44a, 44b, 44c. From the reels 44a, 44b, 44c, the straps 116a, 116b, 116c pass through a series of rollers 45 that turn and flatten the straps 116a, 116b, 116c into an appropriate configuration before they are advanced to the molding press 30. Also, as a further refinement and as shown in FIG. 10, the straps 116a, 116b, 116c pass though a sensing mechanism 46 that is designed to recognize whether the strap material has run out (i.e., one or more reels 44a, 44b, 44c is empty) and responds by halting the manufacturing process. Specifically, although not critical to the present invention and not shown in detail in the accompanying Figures, a separate mechanical arm contacts each of the straps 116a, 116b, 116c. If the strap material runs out, the mechanical arm falls and trips an associated microswitch to halt the manufacturing process.

As described above, the molding press 30 is used to mold the keys directly to and around each of the straps 116a, 116b, 116c. After the keys are so molded and the molding press is opened, the first pair of mechanical arms 42a moves into the mold 32, grasps the molded keys, and then advances the straps 116a, 116b, 116c and molded keys out of the mold cavity 32a and to an intermediate holding station 47. The first pair of mechanical arms 42a releases the molded keys and then returns to the molding press 30 and is prepared to grasp and advance the next set of molded keys.

The purpose of this intermediate holding station 47 is to maintain tension in the straps 116a, 116b, 116c as they are advanced through the manufacturing process. In this regard, the holding station is comprised of a platform 47a adapted to receive the straps 116a, 116b, 116c and molded keys. Once the straps 116a, 116b, 116c and molded keys are received into this platform 47a, a plate 47b is forced downward on top of the keys, preferably by a hydraulic cylinder, to close the holding station 47 and hold the keys in a fixed position with respect to the holding station 47. The closing of the holding station 47 is executed in strict synchronicity with the closing of the molding press 30 and with the closing of the trimming die 50, as will be discussed below.

After the holding station 47, the second pair of mechanical arms 42b moves into the holding station 47, grasps the molded keys, and then advances the straps 116a, 116b, 116c and molded keys to the third component of the manufacturing process, the trimming die 50. The second pair of mechanical arms 42b releases the molded keys and then returns to the holding station 47 and is prepared to grasp and advance the next set of molded keys.

The trimming die 50 trims any webbing scrap between parts or other extraneous materials resulting from the molding of the keys to the straps 116a, 116b, 116c. Furthermore, as discussed above, the keys are molded to continuous lengths of strap material. Therefore, the trimming die 50 also serves to cut the straps 116a, 116b, 116c so that straps having keys integrally molded to each end are ready for insertion into hard hat shells.

Figure 12:
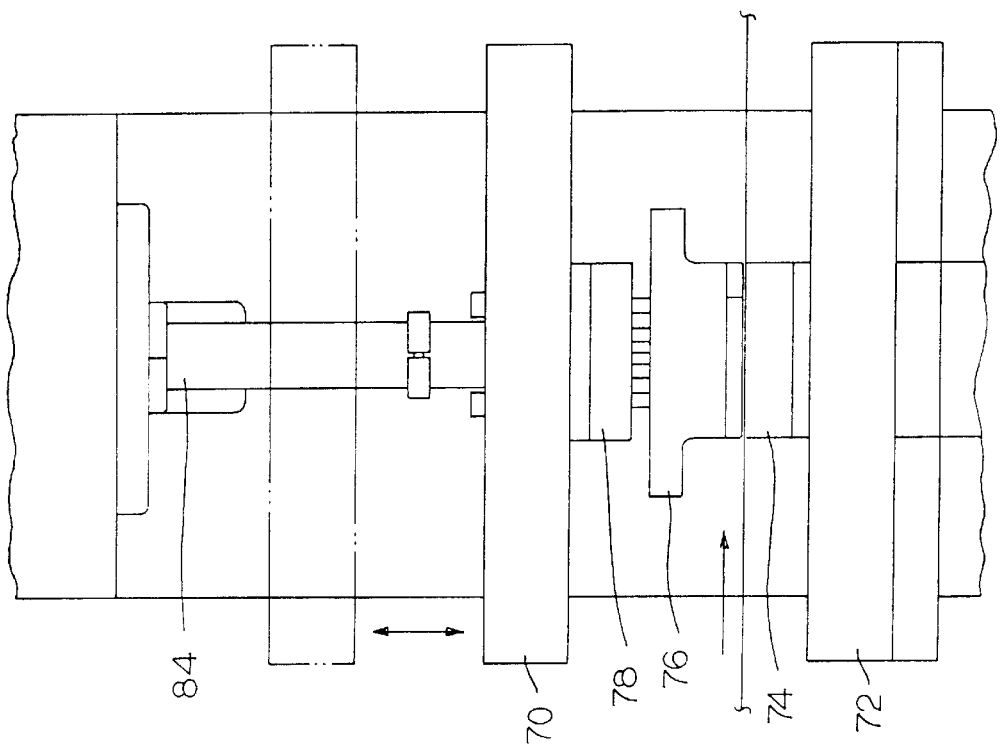
FIG. 12 is an enlarged front view of the preferred trimming die depicted in FIG. 10.
Figure 11:
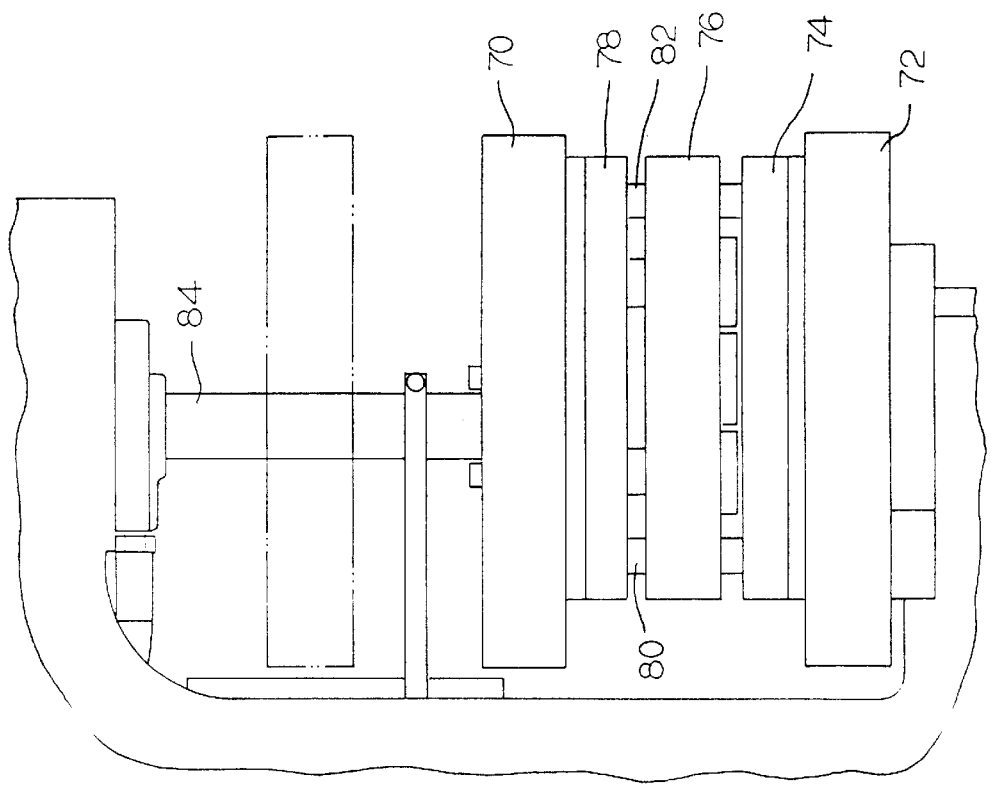
FIG. 11 is an enlarged side view of the preferred trimming die depicted in FIG. 10.

Referring now to the front and side views of the trimming die 50 in FIGS. 11 and 12, the trimming die 50 includes upper and lower die shoes 70, 72. Interposed between the upper and lower die shoes 72, 74 are a die holder 74, a stripper plate 76, and a punch holder 78. These components are supported by and move along guide pins 80, 82 (as shown in FIG. 11). The molded keys are received and retained in the die holder 74. As the trimming die 50 is closed, the stripper plate 76 is forced downwardly (by a hydraulic press generally indicated by reference numeral 84) onto the die holder 74 to prevent movement of the molded keys. Then, punches associated with and held by the punch holder 78 perform the cutting and trimming operation.

In the preferred embodiment described herein, Applicant employs a Model C-300 hydraulic press manufactured and distributed by Air-Hydraulics, Inc. of Jackson, Mich. The trimming die 50 is closed by the hydraulic press in strict synchronicity with the closing of the molding press 30 and with the closing of the holding station 47 to maintain the appropriate tension in the straps 116a, 116b, 116c through the manufacturing process.

Finally, after the trimming operation has been completed, the third pair of mechanical arms 42c moves into the trimming die 50, grasps the molded keys, advances the finished products, and then returns to the trimming die 50 and is prepared to grasp and advance the next set of finished products.

Specifically, the third pair of mechanical arms 42c passes the finished products to a slide arm 90 with an integral gripping mechanism 92. As shown in FIG. 10, unlike the mechanical arms 42a, 42b, 42c which move parallel to the direction of movement of the straps 116a, 116b, 116c, the slide arm 90 moves perpendicular to the direction of movement of the straps 116a, 116b, 116c. After receiving the finished products from the third pair of mechanical arms 42c, the slide arm 90 moves rearward, and then the gripping mechanism 92 releases the finished products down a first chute 94 and into a bin 95.

This movement of the slide arm 90 is necessary to segregate "bad" finished products. Specifically, each roll of the nylon strap material used in the manufacturing process is generally comprised of a plurality of discrete lengths of strap material spliced together by metallic tape. Since spliced straps do not have the structural integrity to be used as part of the suspension of a protective helmet, finished products that include a splice (i.e., "bad" finished products) must be segregated from good finished products. Therefore, in this preferred embodiment, the sensing mechanism 46 described above and shown in FIG. 10 also includes a metal detector which identifies any length of strap that is spliced together by metallic tape. Should this sensing mechanism 46 so identify a "bad" strap, when that length of strap is passed to the slide arm 90 and associated gripping mechanism 92, the "bad" strap is released into the alternate chute 96 and into a bin 97.

Examples of the straps manufactured in accordance with the method of the present invention, as described above, are shown in FIG. 14. Specifically, FIG. 14 illustrates that, in the method of the present invention, the keys are molded end-to-end along the length of the strap at predetermined intervals. Thus, through the trimming operation described above, a finished product results—a strap 16 with keys 18 integrally molded to either end of the strap 16 to create a component of a suspension 14 for a hard hat 10, as shown in FIGS. 1 and 2.

A protective helmet (e.g., a hard hat) made in accordance with the present invention thus meets the requisite ANSI performance requirements, but since the straps of the suspension need not be sewn to the respective keys, the protective helmet is less costly and time-consuming to manufacture.

Also, a protective helmet made in accordance with the present invention has a suspension in which the straps are securely held by the keys. In other words, the construction and orientation of the straps lessens the likelihood that the straps will be pulled free of the keys. In this regard, since the suspension straps extend from the bottoms of the respective keys, when the protective helmet is worn, the straps are forced into a sharp U-turn toward the top of the shell of the protective helmet. Thus, under normal conditions, a force of impact to the shell of the protective helmet will not cause the straps to be pulled from the keys.

Furthermore, the method described herein relates to the molding of a plastic component to a length of fabric for the manufacture of a suspension for a protective helmet. It is contemplated that this method has far broader applicability and could be used to mold various plastic components around and to a length of fabric or similar material.

It will be obvious to those skilled in the art that further modifications may be made to the embodiments described herein without departing from the spirit and scope of the present invention.

What is claimed is:

1. A protect helmet adapted to receive and protect a wearer's head, comprising:

a substantially rigid shell shaped to protect the wearer's head, said shell defining a bottom opening and an internal cavity far receiving the wearer's head, and said shell including a plurality of integral sockets near said bottom opening;

a headband adjacent the bottom opening of said shell; and a suspension comprised of at least two straps intersecting one another within the internal cavity of said shell near an apex of said shell, a key being molded to and around each end of each strap, each key being adapted to be inserted into one of the integral sockets of said shell, and one or more of said keys being adapted for attachment to the headband, wherein said headband said suspension cooperate to separate the wearer's head from said shell by maintaining air gap between said shell and the wearer's head that provides for some attenuation of a force of an impact to said shell.

2. A protective helmet as recited in claim 1, wherein the suspension is comprised of two intersecting straps, said shell defining at least four integral sockets for receiving the four keys molded to around the ends of the respective straps.

3. A protective helmet as recited in claim 2, and further comprising a third strap intersecting said first and second straps and having a key secured to each end thereof, said shell also defining two additional integral sockets for receiving the keys secured to the ends of said third strap.

4. A protective helmet as recited in claim 1, wherein said straps extend from the bottoms of the respective keys, such that, when the protective helmet is worn, said straps are forced into a sharp U-turn toward the top of the shell of said protective helmet.

5. A protective helmet as recited in claim 1, in which the straps are nylon.

6. A protective helmet as recited in claim 1, in which the straps have a fluted surface texture.

7. A protective helmet as recited in claim 5, in which each strap has a width of approximately 0.75 inches.

8. A protective helmet as recited in claim 5, in which each strap has a thickness of approximately 0.015–0.030 inches.

9. A protective helmet as recited in claim 1, in which the keys are molded from a compound selected from the group consisting of: high density polyethylene (HOPE), nylon, low density polyethylene (LDPE), polypropylene, and acrylonitrile butadiene styrene (ABS).

10. A protective helmet as recited in claim 9, in which the keys are molded from high density polyethylene PE).

11. A protective helmet as recited in claim 1, in which said head band includes a plurality of upwardly extending appendages, each such appendage corresponding with and adapted for attachment to a respective key of said suspension.

12. A protective helmet as recited in claim 11, in which each key defines a substantially rectangular opening near the distal end thereof which is adapted to receive a T-shaped protrusion integral with an extending from a corresponding appendage of said head band.

* * * * *

UNITED STATES PATENT AND TRADEMARK OFFICE
CERTIFICATE OF CORRECTION

PATENT NO. : 6,609,254 B2
DATED : August 26, 2003
INVENTOR(S) : Eric Bielefeld and Mark Ferguson It is certified that error appears in the above-identified patent and that said Letters Patent is hereby corrected as shown below:

Column 8,
Line 42, correct to read -- A protective helmet adapted to receive and protect a wearer's head --
Line 46, replace the word "far" with -- for --
Line 57, insert the word -- and -- between "headband" and "said"
Line 58, insert the word -- an -- after "maintaining"
Line 65, insert the word -- and -- between "to" and "around"

Column 10,
Line 1, correct "(HOPE)" to read -- (HDPE) --
Line 5, correct "PE)" to read -- (HDPE) --

Signed and Sealed this

Sixteenth Day of December, 2003

JAMES E. ROGAN
*Director of the United States Patent and Trademark Office*